June 6, 1944.  C. H. KRUEA  2,350,623
COMBINATION BASTING AND SKEWERING DEVICE
Filed Sept. 5, 1941
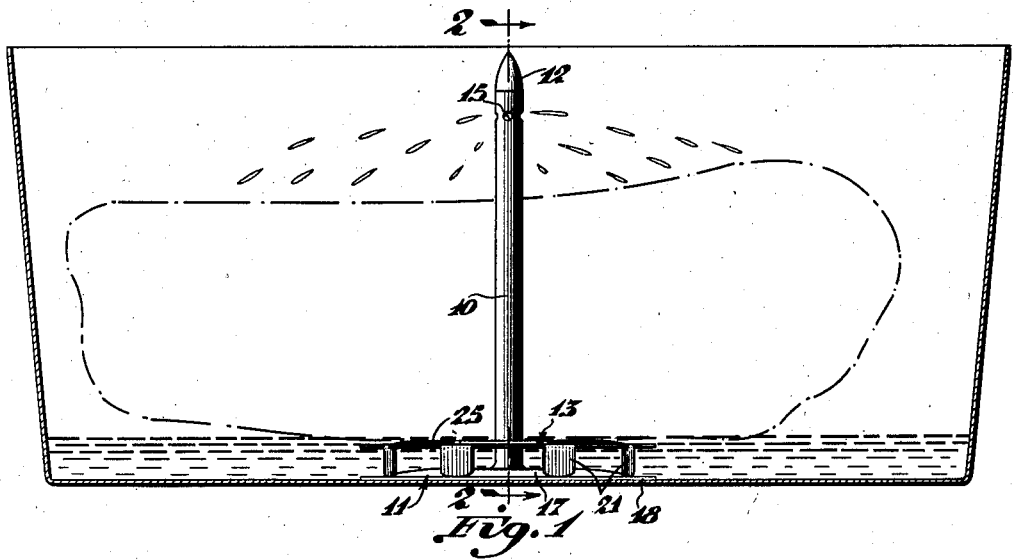
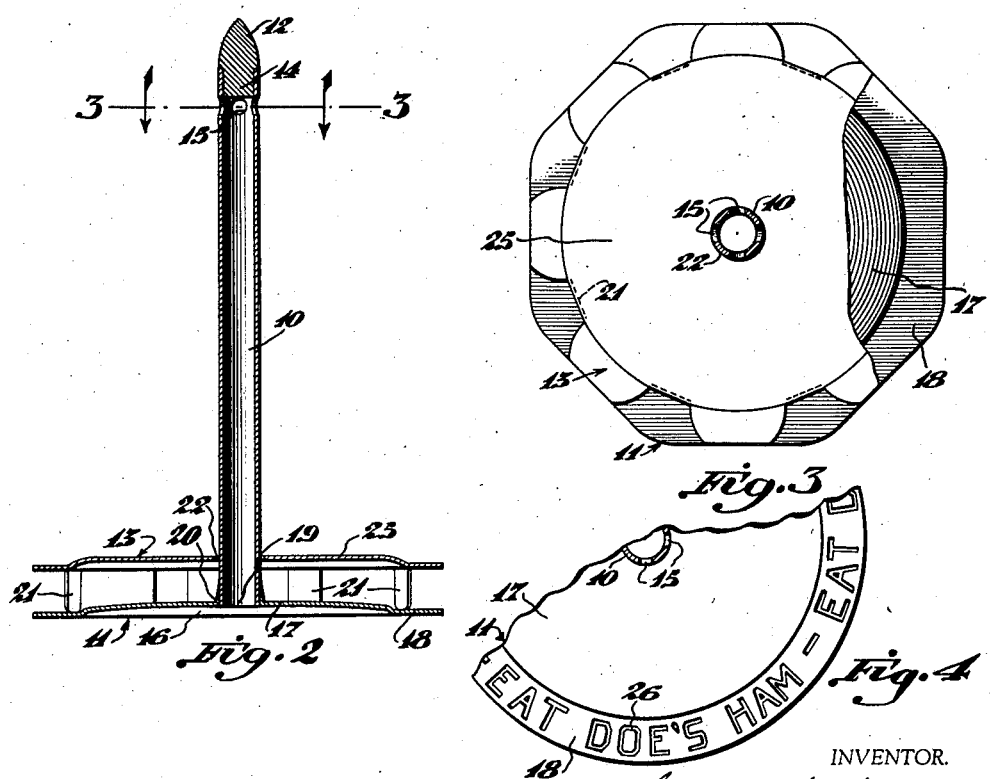
INVENTOR.
BY Charles H. Kruea
ATTORNEYS

UNITED STATES PATENT OFFICE 2,350,623

COMBINATION BASTING AND SKEWERING DEVICE

Charles H. Kruea, Fort Thomas, Ky.

Application September 5, 1941, Serial No. 409,715

2 Claims. (Cl. 99—346)

This invention relates to combination basting and skewering devices and is directed particularly to a device of this nature which may be placed as a unit in any conventional roasting pan.

The inventor here realizes the prior development of this art. A number of devices have been developed for automatically basting meats, replacing the old and well-known hand basting method. It is realized that these devices have incorporated structures adapted to raise the basting liquid by means of a thermal tube for ejecting it over the top of the meat. Representative examples of prior patents may be found in those to Holloway No. 1,339,625, patented May 11, 1920, and Spitz No. 1,349,302, patented August 10, 1920. However, as set forth below, it has been the general object of the present inventor to improve these devices of the past.

It has been one object of the present inventor to provide an automatic baster and skewer of simple construction which incorporates a few, easily fabricated parts without sacrifice of efficiency of operation or simplicity of design. The present device is adapted to operate as well if not better, in some respects, than the expensive and complex devices provided for this purpose heretofore.

It has been another object to provide a simple basting and skewering device which is adapted to be used with any of the well-known, flat bottomed roasting pans, whereby, with the present device, it is not necessary to provide a specially constructed pan as has been necessary with many of the automatic basters provided in the past.

A further object has been to provide an automatic basting device which incorporates means for straining out those particles, such as spices, other condiments, and bits of the meat itself which are found in the bottoms of roasting pans. In this way, only the flavored juices are permitted to flow over the meat and the passageways in the baster are not apt to become clogged. Toward this end the base of the device may be provided with a flat marginal portion and a central raised portion constituting a cavity in which liquid pressure is developed for raising the juices thermally and forcibly expelling them from the top of a tube extending upwardly from the chamber or cavity.

A still further object has been to provide a basting device which includes a platform element for raising the meat out of contact with the bottom of the pan. The bottom of the meat, therefore, is suspended in the roasting juices and with constant automatic basting, the meat can be cooked faster at a higher temperature without danger of burning or drying out.

Other objects and advantages of the present invention will be apparent from the following description of the drawing in which:

Figure 1 is a side view illustrating a device of the present invention in place in a roasting pan.

Figure 2 is a vertical sectional view of the baster taken on line 2—2, Figure 1.

Figure 3 is a sectional view taken on line 3—3, Figure 2.

Figure 4 is a fragmentary plan view of a modified base.

In the preferred embodiment the baster provided here includes relatively few parts: a hollow, tubular skewer element 10 including a base 11; a pointed cap or spear head 12 in the upper end of the skewer; and a removable platform element 13.

The meat is impaled on the skewer tube and rests on the platform element 13 with a portion of the tube extending above the top of the meat (Figure 1). The cap or plug 12 includes a counterturned portion 14 at its lower end which is press-fitted into the upper end of the hollow skewer tube. The upper end of the cap is pointed to provide a means for impaling the meat. Just below the inserted portion 14 of the cap, a plurality of outlet holes 15 is provided in the skewer tube. The base 11 is recessed to provide, in conjunction with the bottom of the pan, a thermal chamber 16. It may be seen that the roasting juices, upon boiling and due to thermal action, will pass from the chamber, up the skewer tube 10, and out through the openings 15. The bottom face of the inset portion of the cap 14 acts as a deflector for the juices as they rise up through the tube. Thus, the juices are forced out through the openings on all sides of the skewer tube.

The hollow skewer tube is attached to the base 11 and extends upwardly therefrom. Specifically, the base includes a raised center portion 17, on the order of a flat dome, and a flat marginal portion 18 upon which the baster rests. With the base resting on the bottom of a pan, the raised center portion 17 provides the chamber 16. The flat portion 18 of the base resting on the bottom of the pan around the chamber provides a strainer for the roasting juices entering the chamber since the juices must seep under it to the chamber. The skewer tube 10 is attached to the center of the base 11 and is open to the chamber 16 as at 19. The tube may be secured to the base by soldering. In the instance shown, a lip 20 is turned up at the margin of the opening 19 and the tube is soldered therein.

Although the flat portion 18 of the base seats substantially flush on the bottom of the basting pan the slight irregularities in the bottom of any such pan as well as small particles of solid matter from the meat which drop to the bottom during the roasting process are sufficient to permit some of the basting fluid to enter the thermal chamber 16. Once there is any quantity of fluid in the thermal chamber it boils very quickly because of the narrow confines of the space. As the fluid is boiled, steam is generated and the upward movement of this steam causes the base to rock very slightly and thereby to permit the flow of additional basting fluid into the chamber. It is possible that a certain amount of capillary action enters into the operation also.

The platform element 13 includes a plurality of legs 21 which are bent downwardly from the edge thereof. A hole 22 in the center of the platform permits the platform to be slipped down over the tube 10 so that the legs 21 rest on the upper face of the annular flat portion 18 of the base. The center portion of the platform may be raised in order that a strengthening portion 25 be provided. To simplify manufacture, the platform may be formed from blanks of the shape of the base 11. It will be noted that both the platform and base are generally octagonal in shape. This shape is not essential and circular ones or other shapes may be used.

In the modified form shown in Figure 4, advertising, indicated at 26, may be embossed around the flat marginal portion 18. The printing, embossed as shown, provides ridges slightly raising portions of the flat marginal flange 18 from the surface of the bottom of the roasting pan. This spacing thus provided is almost imperceptible and will interfere in no way with the straining effect produced as the basting juices are drawn under the flat margin into the thermal cavity. In fact, this very slight raising, in cases where a heavy roast is being basted, will permit the juices to pass beneath the margin without too much difficulty.

The inventor has found in this case that the flat marginal portion being in direct contact with the bottom of the roasting pan; that is, in metal to metal contact, will heat up the juices at this point and accentuate the thermal action, which impels the basting juices upwardly through the tube and out through the openings. Considerable pressure is developed and the basting juices are expelled violently so as to effectively baste the entire roast especially in cases where the roast is quite large; that is, extends over a considerable area.

Having described my invention, I claim:

1. A basting device comprising a thin sheet metal element including a base portion and a tube rising from the center thereof, said base portion including a flat marginal flange lying in a plane at right angles to the axis of the tube and adapted to seat substantially flush on the bottom of the basting pan and a central dome portion, said central dome portion providing in conjunction with the bottom of the basting pan an enclosed thermal chamber for confining the basting juices and accelerating the boiling action, said tube including a pointed upper end, a plurality of outlet apertures in the sides of the tube radially disposed and positioned directly beneath said pointed end and a deflector element in the tube between the end and the apertures whereby basting juices rising in the tube contact said deflector and are sprayed outwardly through the apertures to provide a uniform basting action over a substantially wide area.

2. A basting device comprising a base portion and a vertical tube portion interconnected therewith, said base portion including a central dome portion devoid of openings except to the tube portion, said central dome portion providing in conjunction with the bottom of the basting pan an enclosed thermal chamber for confining the basting juices and accelerating the boiling action, and a substantially flat marginal flange forming an outwardly extended peripheral edge for the dome portion, said flange being formed from thin sheet metal and being so constructed and positioned with respect to the bottom of the basting pan as to provide a seat thereon which is substantially flush but insufficiently so to prevent seepage from the basting pan into the thermal chamber during the operation of the device, said vertical tube being extended upwardly from a central point of the dome portion and having an open upper end for the emission of juices which have seeped under the flange into the thermal chamber and have been heated to a boiling point in said chamber.

CHARLES H. KRUEA.